(12) United States Patent
Shaw et al.

(10) Patent No.: US 8,886,209 B2
(45) Date of Patent: Nov. 11, 2014

(54) LONG TERM EVOLUTION INTEGRATED RADIO ACCESS NETWORK SYSTEM LEVERAGE PROACTIVE LOAD BALANCING POLICY ENFORCEMENT

(71) Applicant: AT&T Intellectual Property I, LP, Atlanta, GA (US)

(72) Inventors: Venson M. Shaw, Kirkland, WA (US); Jin He, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 36 days.

(21) Appl. No.: 13/712,404

(22) Filed: Dec. 12, 2012

(65) Prior Publication Data
US 2014/0162661 A1    Jun. 12, 2014

(51) Int. Cl.
*H04W 72/00* (2009.01)
*H04W 36/22* (2009.01)

(52) U.S. Cl.
CPC .................................... *H04W 36/22* (2013.01)
USPC ........ 455/453; 455/439; 455/435.3; 370/331; 370/338

(58) Field of Classification Search
CPC ...... H04W 36/14; H04W 24/02; H04W 24/08
USPC ............. 455/436–444, 446, 435.3, 450–453; 370/331–333, 338
See application file for complete search history.

(56) References Cited

U.S. PATENT DOCUMENTS

| | | | |
|---|---|---|---|
| 8,204,000 B1* | 6/2012 | Srinivas et al. ............... | 370/328 |
| 8,208,925 B2* | 6/2012 | Attar et al. .................... | 455/436 |
| 8,224,325 B2* | 7/2012 | Zhang et al. ............... | 455/435.3 |
| 8,254,950 B2* | 8/2012 | De Pasquale et al. ........ | 455/453 |
| 8,285,291 B2* | 10/2012 | Dinan et al. .................. | 455/443 |
| 8,509,780 B2* | 8/2013 | Sridhar et al. ................ | 455/436 |
| 8,594,672 B2* | 11/2013 | Agrawal et al. .............. | 455/436 |
| 8,606,274 B2* | 12/2013 | Borst et al. ................... | 455/436 |
| 8,639,259 B2* | 1/2014 | Ishii et al. .................. | 455/452.1 |
| 2010/0135206 A1* | 6/2010 | Cherian et al. ................ | 370/328 |
| 2011/0252477 A1* | 10/2011 | Sridhar et al. .................. | 726/24 |
| 2012/0236717 A1* | 9/2012 | Saska et al. ................... | 370/235 |
| 2013/0094472 A1* | 4/2013 | Klingenbrunn et al. ...... | 370/331 |
| 2013/0122913 A1* | 5/2013 | Agarwal et al. .............. | 455/439 |
| 2013/0189991 A1* | 7/2013 | Rose et al. .................... | 455/436 |
| 2014/0038605 A1* | 2/2014 | Behnamfar et al. .......... | 455/436 |

* cited by examiner

*Primary Examiner* — Sharad Rampuria
(74) *Attorney, Agent, or Firm* — Baker Hostetler LLP

(57) ABSTRACT

A method may comprise receiving, at a server configured in a long term evolution network, information indicative of a condition of utilization of a first radio access technology resource accessible by a user device. If the condition of utilization indicates an adverse network condition, then the server may transmit a change command instructing the user device to migrate to a second radio access technology resource.

20 Claims, 15 Drawing Sheets

LONG TERM EVOLUTION INTEGRATED RADIO ACCESS NETWORK SYSTEM LEVERAGE PROACTIVE LOAD BALANCING POLICY ENFORCEMENT

TECHNICAL FIELD

The technical field generally relates to wireless communications, and more specifically relates to long term evolution ("LTE") integrated radio access network system leverage proactive load balancing policy enforcement, and more specifically relates to providing a centralized solution which is capable of efficiently and intelligently allocating radio resources across multiple radio access technologies to manage capacity and utilization dynamically and provide customer requested quality of service (QoS) on demand.

BACKGROUND

In current wireless networks, such as long term evolution (LTE) networks, wireless network service providers deliver wireless data access service based on the user equipment (UE) device capability and the available radio access technologies (e.g., 2G, 3G, 4G, WiFi, WiMAX, etc.). Such solutions primarily benefit small-to-medium sized wireless network service providers.

It would be beneficial to large wireless service providers or service providers which own multiple radio access technologies (RAT) across the country, to have a more centralized and unified solution that is capable of efficiently and intelligently allocating radio resources across multiple radio access technologies to manage capacity and utilization dynamically, and provide customer requested QoS on demand.

SUMMARY

A method of the present disclosure may comprise receiving, at a server configured in a long term evolution network, information indicative of a condition of utilization of a first radio access technology resource accessible by a user device. If the condition of utilization indicates an adverse network condition, then the server may transmit a change command instructing the user device to migrate to a second radio access technology resource.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
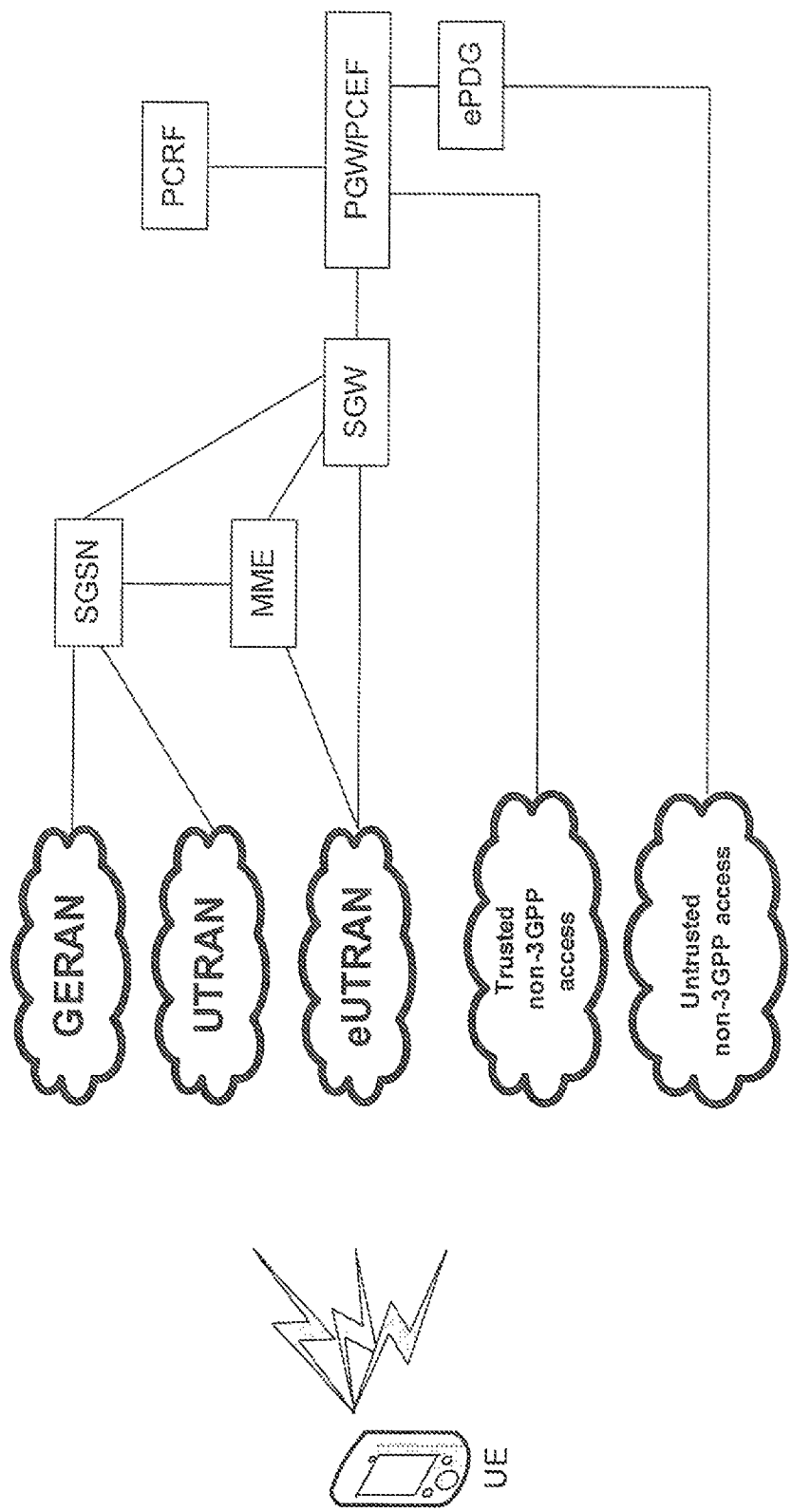
FIG. 1 is a logical diagram illustrating a radio access network.

Referring to FIG. 1, according to one method of employing radio access technologies (RAT), a UE may have access to several RATs, for example, GERAN, UTRAN, eUTRAN, trusted non-3GPP access, and untrusted non-3GPP access. Each of these RAT's may be managed by independent elements, resulting in no centralized management. The UE may select which RAT to use for data service based on its own configuration and/or based on an associated cell tower's broadcast channel information. When the UE has acquired access to an RAT, it will generally maintain access with that RAT unless the UE's RAT function is manually turned off; the UE is requesting voice service while it is accessing a RAT that does not provide voice service; or the UE has moved outside the current RAT's coverage area. Unless and until an entire network is covered 100% by LTE, a migratory UE may move from LTE coverage to non-LTE coverage, for example, moving from 4G to another network. For example, a UE may move from an LTE network to a circuit switch voice network, which may be congested, and may result in dropped calls, loss of data, etc. Thus, due to network architecture, the network is unable to proactively balance the load based on the RAT utilization status. As a result, it is possible that a UE could, for example, have one 3GPP IP access and one non-3GPP IP access for common UE's.

Figure 2:
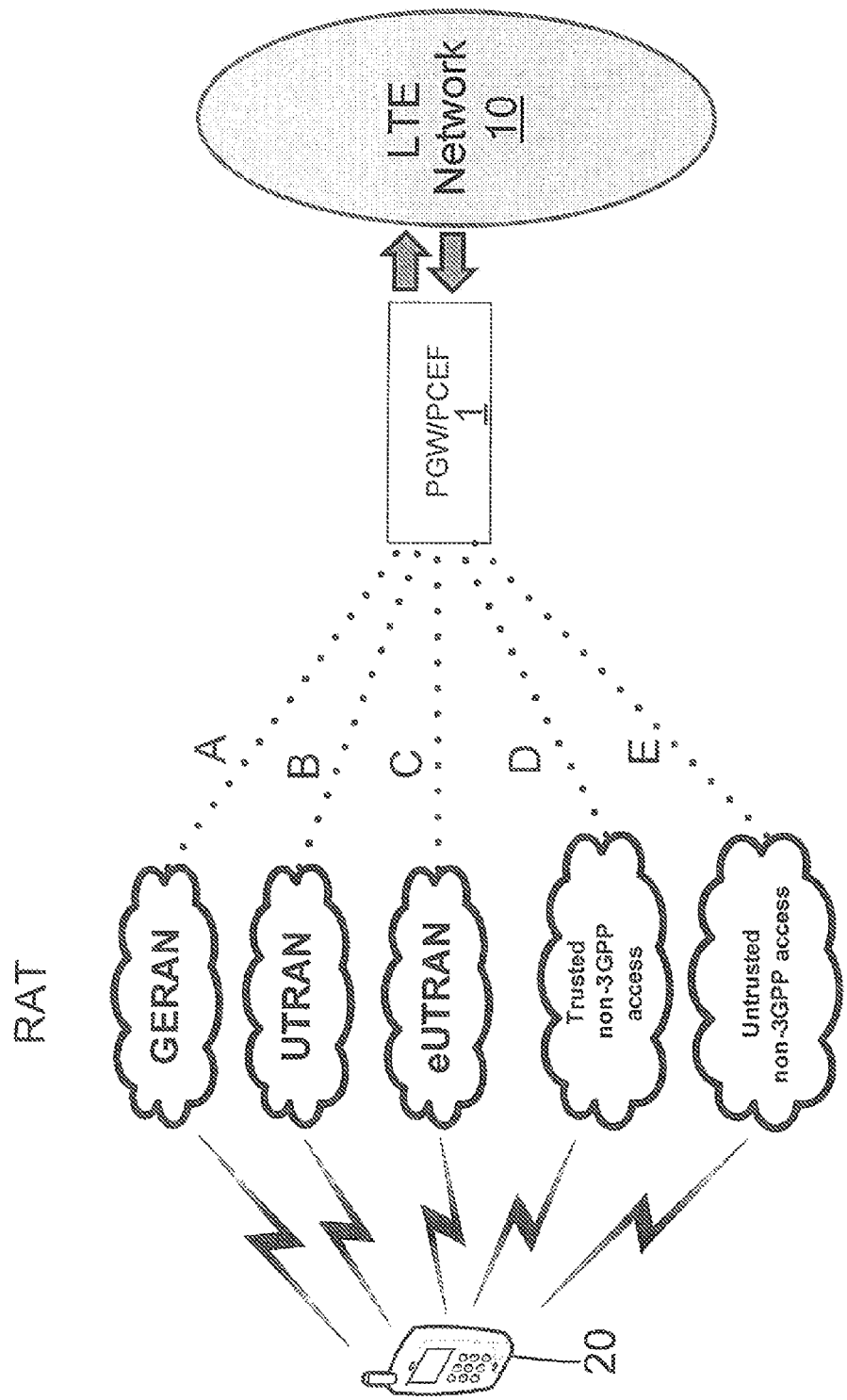
FIG. 2 illustrates a non-limiting exemplary network configuration in which LTE integrated radio access network methods and systems may be implemented.

Referring now to FIG. 2, there is illustrated one aspect of the present disclosure. In this aspect, new logical interfaces, for example A, B, C, D, and E, may be defined between each respective RAT, i.e., GERAN, UTRAN, eUTRAN, Trusted non-3GPP access, and Untrusted non-3GPP access, and a core network 1, illustrated in this example as Policy Gateway/Policy Charging Enforcement ("PGW/PCEF"), which may be a server configured in and/or connected to a long term evolution (LTE) network 10. One or more UE's, 20, may access one or more of the RATs. Employing this methodology, each RAT's utilization information may be reported to the core network 1, and this may occur in real time.

When the PGW/PCEF is enforcing the policy for any UE's 20 service request, it may evaluate the request with the utilization information of that UE's current RAT. The PGW/PCEF may be able to determine and/or predict, based on utilization data received from the RAT(s), that one or more RATs are too congested, or are in jeopardy of becoming too congested, to provide UE 20 requested QoS on demand, and thus the PGW/PCEF may be able to transmit a change command instructing the UE 20 to migrate to a different RAT. Implicit in this capability is that the PGW/PCEF may have the ability to determine the relative utilization and/or capacity of different RATs, and thereby select and transmit a change command to an available RAT that may provide enhanced QoS relative to a UE's currently accessed RAT.

If the UE's current RAT is experiencing an overload condition, then the PGW/PCEF may be able to enforce, by transmitting a change command to the UE, changing to a different RAT. Generally speaking, an "overload condition" occurs when the RAT approaches maximum capacity, for example, about 80% of capacity. Furthermore, even if the UE's current RAT is not experiencing an overload condition, but is approaching an overload condition, the PGW/PCEF may be able to enforce the UE changing to a different RAT, again, by transmitting a change command to the UE. In this way, the load balancing techniques of the present disclosure permit automatic detection of an overload or anticipated overload condition in a network a UE is currently using or attempting to access, and can automatically switch that UE to a different, less congested, network. For example, if a cell serving a particular area, cell A, has a maximum capacity of 100 users, the load balancing technique of the present disclosure may compare the current number of active users in that area with another nearby cell, cell B. If, for example the cell A is experiencing 85 active users, and the nearby cell B is experiencing only 40 active users, the system may compare the number or active users for each cell and use this comparison to switch some of the active users from cell A to cell B. The system of the present disclosure may also perform time of day pre-programmed switching, for example, by anticipating rush hour or morning hour time of day periods known to experience peak usage as a means for performing pre-programmed switching. The system of the present disclosure may also use UE-initiated switching.

The PGW/PCEF may trigger a change to and/or update of a UE's RAT via a Radio Information Management (RIM) approach. Such a RIM approach may permit the PGW/PCEF to instruct a target cell tower that the UE is migrating to that cell tower; may proactively allocate radio resources to that cell tower; may transfer the radio access information to the UE via the PGW/PCEF; and may allow the UE to use the received radio access information to switch to the target cell tower, which target cell tower may be within the same RAT or in a different RAT. Such cell tower switching may enable minimized service interruption time.

Figure 1A:
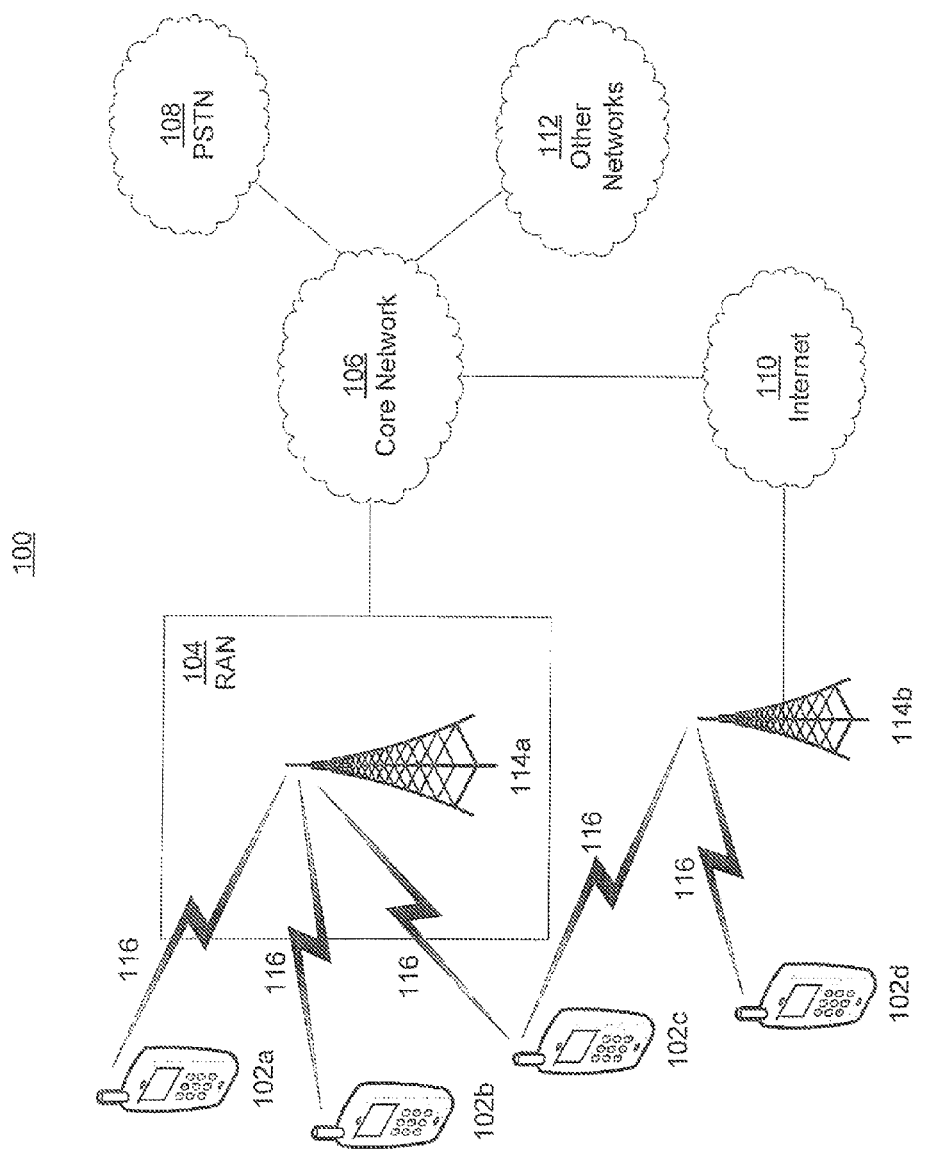
FIG. 1A is a system diagram of an example communications system in which LTE integrated radio access network methods and systems may be implemented.

FIG. 1A is a diagram of an example communications system 100 in which LTE integrated radio access network systems and methods as disclosed herein may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1A may also be referred to herein as a network.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
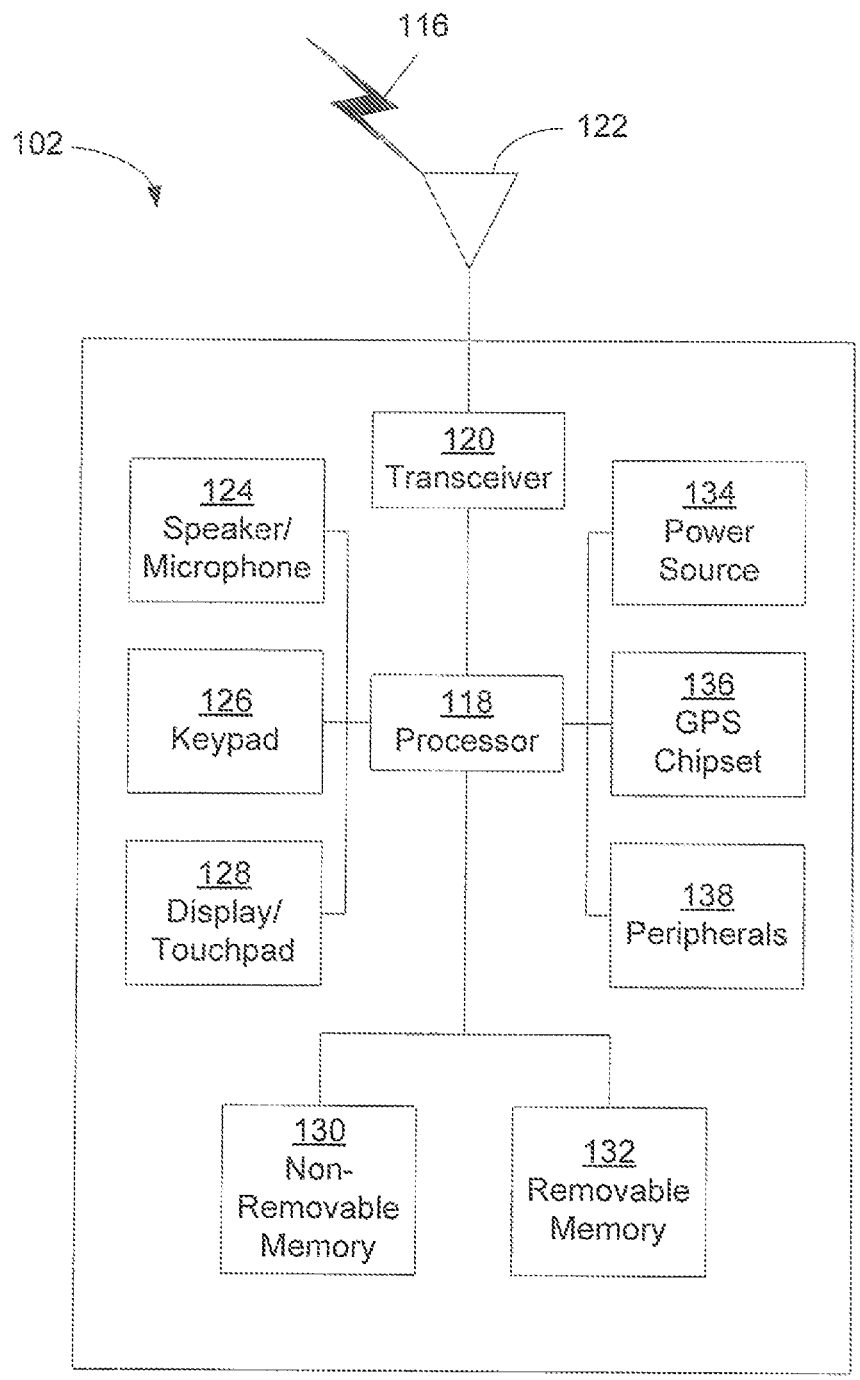
FIG. 1B is a system diagram of an example mobile device (also referred to as a wireless transmit/receive unit (WTRU) and/or as user equipment (UE)) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The WTRU may be configured in a long term evolution network and may comprise the transceiver 120, a non-removable memory 130 and/or a removable memory 132 comprising instructions, and a processor 118, wherein the processor, when executing the instructions, may perform operations comprising accessing a first radio access technology resource, such as RAN 104 illustrated in FIG. 1A, or those illustrated in FIG. 2, receiving information indicative of a condition of utilization of the first radio access technology resource. If the received information indicative of the condition of utilization indicates an adverse network condition, which may be one or more of an overload condition of utilization, an anticipated overload condition, or a low signal strength condition of the first radio access resource, or an anticipated major event expected to cause both major outages and/or increased demands for service from the first radio access resource, such as a natural disaster, like a major hurricane, the processor 118 may then instruct the WTRU to migrate to a second radio access technology resource, for example, one that is not experiencing an adverse network condition, or is experiencing an adverse network condition that is less severe than the adverse network condition that the first radio access technology resource is experiencing. The WTRU may receive the information indicative of condition of utilization of the first radio access technology resource occurs in real time.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATS, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
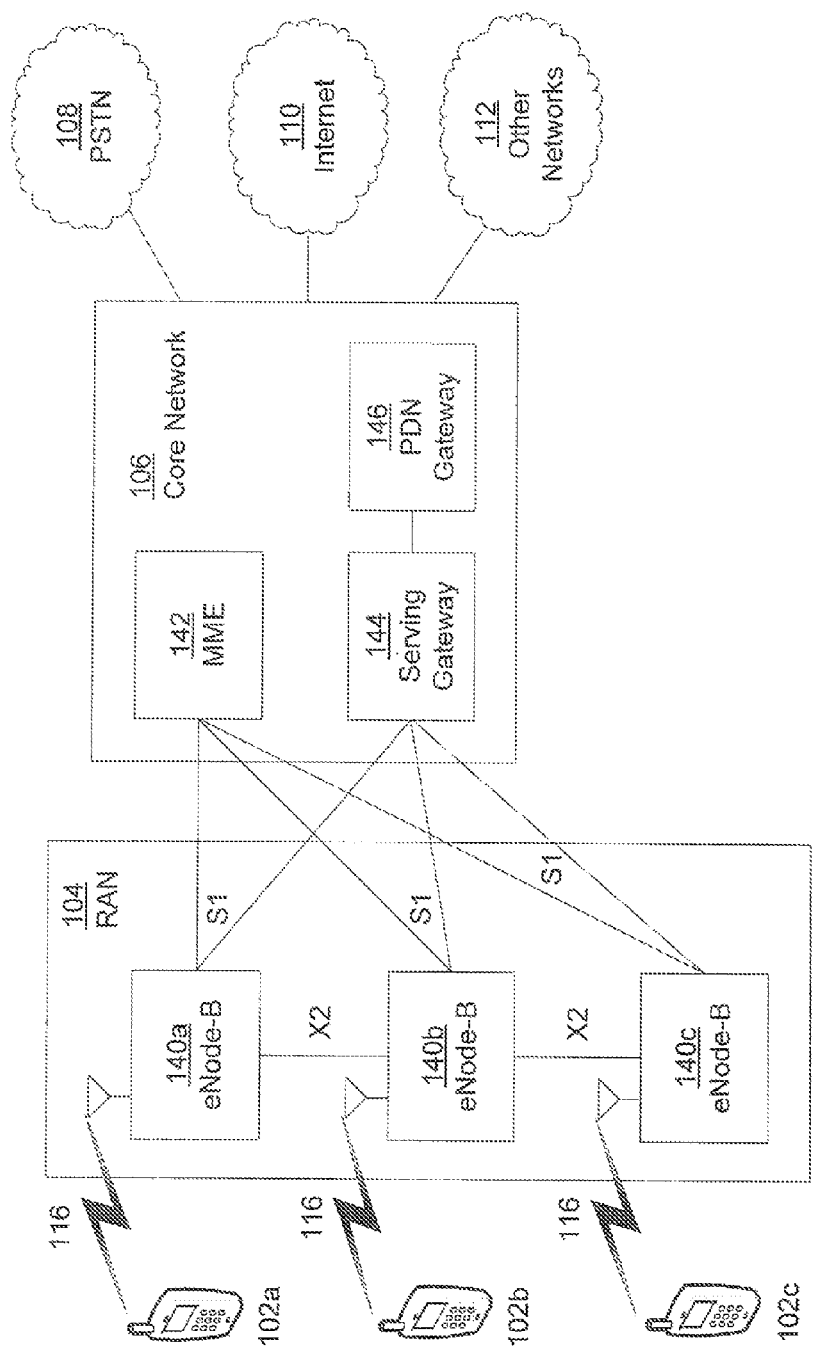
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2A:
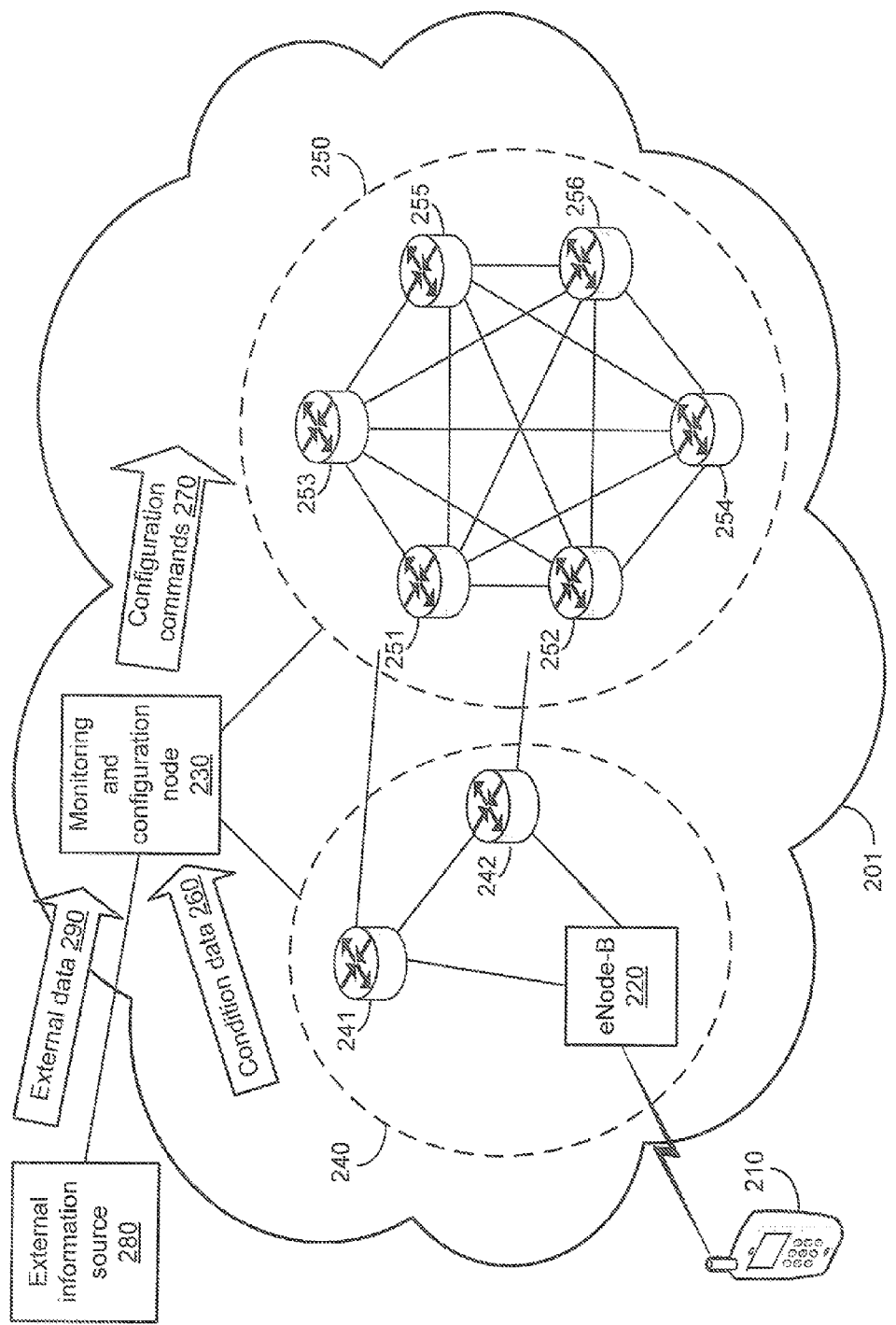
FIG. 2A illustrates an exemplary network configuration and signal flow that may be used in an embodiment.

FIG. 2A illustrates an exemplary network configuration and signal flow that may be used in an embodiment. Mobile device 210, in an embodiment operated by a customer of a provider of network 201, may be in communication with network 201 via eNode-B 220. Mobile device 210 may be any type of wireless communications device, including a UE, a WTRU, or any other communications device as disclosed herein, or any other type of device capable of being configured to perform the functions and features of the present disclosure. Network 201 may be any type of communications network, including a wireless network, a wired network, and a combination thereof, implementing any number and type of communications protocols and technologies. eNode-B 220 may be in radio access network (RAN) 240 portion of network 201 and may be any type of eNode-B, or any other type of RAN device or edge device, and represents any device capable of performing the functions and activities described herein. All such embodiments are contemplated as within the scope of the present disclosure.

RAN 240 may include devices 241 and 242 that may be any type of RAN devices. RAN 240 and/or devices therein may be communicatively connected to core network 250. Core network 250 may include devices 251, 252, 253, 254, 255, and 256, which may be any type of network device, element, or system that may be configured in a core network. Monitoring and configuration node 230 may be communicatively connected to both RAN 240 and core network 250, and maybe any number and type of devices configured to implement any aspect of the present disclosure.

Monitoring and configuration node 230 may receive condition data 260 from either or both RAN 240 and core network 250. Condition data 260 may also be provided, or retrieved from, network systems such as network performance management systems and operational support systems (OSS) that may provide counters, alarms, errors, etc. that may be included in condition data 260. Condition data 260 may include information from devices operating at any layer of a network, including LTE devices such as policy charging and rules function (PCRF) devices, multiprotocol label switching (MPLS) devices, etc. Condition data may be received in-band or out-of-band. Condition data 260 represents any and all condition data or other data described herein, and any number of transmissions of such data and any form of reporting such data, that may be sent from any device, element, or system in any portion of network 201, including RAN 240 and 250. In an embodiment, monitoring and configuration node 230 may be directly connected to each device from which it receives condition data and/or may maintain virtual or logical connections to such devices. Alternatively, monitoring and configuration node 230 may receive aggregated condition data representing condition data for more than one device that has been aggregated by one or more devices and sent on behalf of a plurality of devices. All such embodiments are contemplated as within the scope of the present disclosure.

In an embodiment, each node within network 201, or within a portion of network 201, may transmit condition data to monitoring and configuration node 230. Each node may be configured to transmit such data on a periodic basis, based on some condition criterion being met, or upon any or predetermined changes in device and/or link conditions. For example, a node such as device 253 may be configured to transmit condition data to monitoring and configuration node 230 every minute. Alternatively, device 253 may be configured to transmit condition data to monitoring and configuration node 230 any time a condition on or detectable by the device meets a threshold or other condition (e.g., a link attached to device 253 exceeds a threshold of utilization, a processor on device 253 exceeds a threshold of utilization, the amount of traffic processed by device 253 exceed a threshold, etc.). Alternatively, device 253 may be configured to transmit condition data to monitoring and configuration node 230 when any condition on the device changes or changes significantly. For example, processor utilization or a link utilization increasing by more than a predetermined threshold may trigger a condition data transmission. Any other criteria or configuration may be used to determine when and how condition data is transmitted to monitoring and configuration node 230, and all such embodiments are contemplated as within the scope of the present disclosure.

Using the condition data received at monitoring and configuration node 230, this node may analyze the condition of the network, or the portion of the network for which condition data has been received, as a whole to determine whether any configuration changes should be made. If the condition data as analyzed indicates that there are adverse or less than ideal conditions in the network that may be addressed by reconfiguration of devices within the network, or that adverse or less than ideal conditions are likely to occur if no reconfiguration is performed (i.e., predicting future adverse conditions), monitoring and configuration node 230 may then transmit configuration commands 270 to one or more devices in network 201. Configuration commands 270 represents any and all configuration commands or any other commands described herein, and any number of transmissions of such commands and any form of providing such commands, that may be sent from monitoring and configuration node 230 to any device, element, or system in any portion of network 201, including RAN 240 and 250.

In an embodiment, configuration commands 270 may include commands that instruct network devices within network 201 to redirect traffic from highly congested network nodes, links and/or areas to less congested network nodes, links and/or areas. Such commands may also, or instead, instruct one or more network devices within network 201 to re-provision network capacity to increase traffic capacity for highly congested network nodes, links and/or areas and/or reducing traffic capacity for less congested network nodes, links and/or areas. In another embodiment, configuration commands 270 may include commands that instruct network devices within network 201 relax delivery time requirements for traffic (e.g., changing delivery requirements of such traffic from real-time requirements to non-real-time requirements) for service delivery in highly congested network nodes, links and/or areas and/or tighten delivery time requirements (e.g., changing delivery requirements of such traffic from non-real-time requirements to real-time requirements) for service delivery in less congested network nodes, links and/or areas. In another embodiment, configuration commands 270 may include commands that instruct network devices within network 201 redirect network traffic with real-time delivery requirements to less congested network nodes, links and/or areas, and/or redirect network traffic with non-real-time delivery requirements to more congested network nodes, links and/or areas.

Condition data taken into account and/or analyzed by a device such as monitoring and configuration node 230 may include any type of utilization and/or congestion data for devices, device components, and virtual and/or physical links between devices. Condition data may also include any indications of the types of traffic being transported across a network or portion of a network (e.g., the protocol used in any portion of the traffic) and the requirements of such traffic (e.g., quality of service parameters). All types and forms of condition data that may indicate any condition of a network element, link, portion, or area are contemplated as within the scope of the present disclosure.

In an embodiment, condition data may be received by a device such as monitoring and configuration node 230 in response to probing activities by monitoring and configuration node 230. For example, rather than devices within network 201 being configured to transmit condition data to monitoring and configuration node 230, monitoring and configuration node 230 may be configured to probe such devices for the data. Monitoring and configuration node 230 may transmit queries or polling requests to network devices in order to obtain condition data. Such probing may be passive in that the probed devices are not specifically configured to interact with monitoring and configuration node 230, but rather monitoring and configuration node 230 may use existing methods or means for obtaining condition information, such as already existent reporting mechanisms configured on network devices. Alternatively, devices within network 201 may not be configured to transmit condition data to monitoring and configuration node 230 proactively, but may instead be configured specifically to respond to queries from monitoring and configuration node 230 for such data. All such embodiments are contemplated as within the scope of the present disclosure.

In an embodiment, monitoring and configuration node 230 may receive external data 290 regarding events that are occurring or have occurred external to network 201. For example, monitoring and configuration node 230 may receive natural disaster data from an emergency services agency. Alternatively, external data 290 may be news, media, or any other information that may be received by monitoring and configuration node 230. External data 290 may be received from external information source 280, which may be any device, system, entity, or any combination and number thereof, that may be configured to provide event data to monitoring and configuration node 230.

In response to receiving external data 290, monitoring and configuration node 230 may transmit configuration commands 270 to reconfigure one or more network elements. For example, if external data 290 indicates that an area of network 201 is likely to be affected by a natural disaster, monitoring and configuration node 230 may transmit configuration commands 270 to elements in network 201 that cause those elements to route traffic around that area. This may help avoid outages and deterioration of service by routing traffic around a potential problem area of the network before an actual problem arises.

In an embodiment, policies may be used based on external data 290 and/or condition data 260. For example, characteristics of an event such as a type, location, track or trajectory (e.g., of a storm, hurricane, etc.), probability of occurrence, population impact, customer impact, duration, technology impact, second order effects, third order effects, etc. of an event may be compared to policies configured on monitoring and configuration node 230 in order to determine the appropriate configuration commands 270 to provide to network devices. By using such policies and/or rules, flexibility and dynamic response to events and network conditions may be integrated into a device or system such as monitoring and configuration node 230, allowing it to more quickly and effectively change the network configuration to provide better service. Differences in time scale (e.g., speed of response, polling, probing, etc.) may be implemented in response to a policy determination as may be changes in granularity and automation (e.g., types and frequency of condition and event data used and/or received by monitoring and configuration node 230). Any policies in use may allow for staging of other policies in preparation for condition and/or event changes and may also allow for reconfiguration of policies as an event or condition continues.

Figure 3:
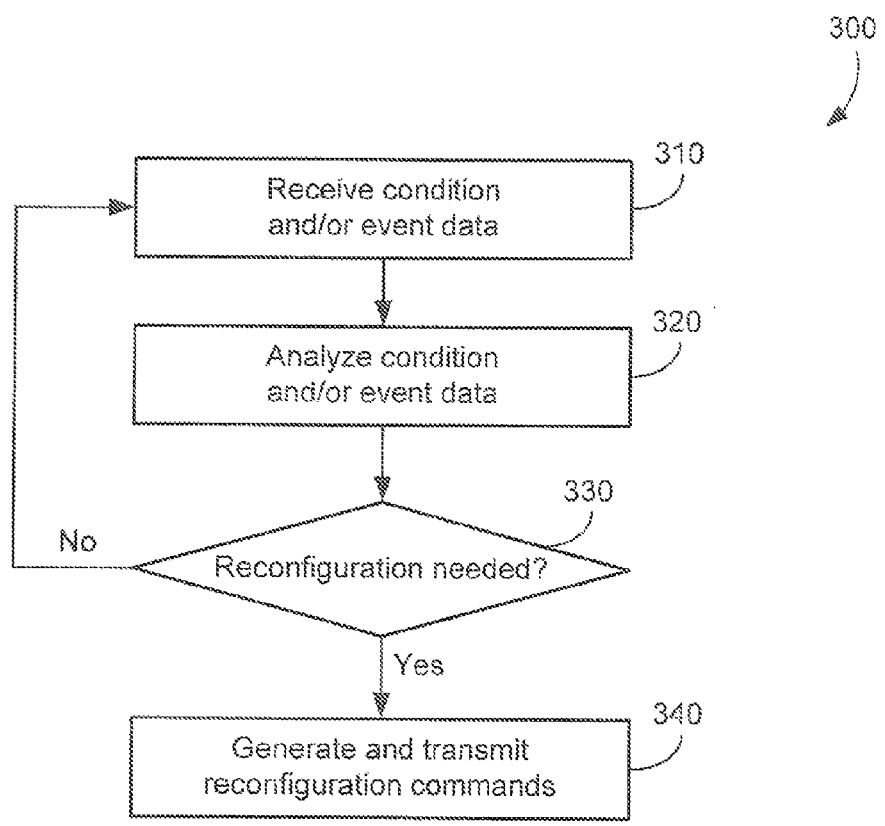
FIG. 3 illustrates a non-limiting exemplary method of implementing LTE integrated radio access network methods and systems.

FIG. 3 illustrates exemplary, non-limiting method 300 of implementing an embodiment as disclosed herein. Method 300, and the individual actions and functions described in method 300, may be performed by any one or more devices, including those described herein. In an embodiment, method 300 may be performed by a device such as monitoring and configuration node 230, in some embodiments in conjunction with other network elements, and/or software configured and/or executing on any network element. Note that any of the functions and/or actions described in regard to any of the blocks of method 300 may be performed in any order, in isolation, with a subset of other functions and/or actions described in regard to any of the other blocks of method 300 or any other method described herein, and in combination with other functions and/or actions, including those described herein and those not set forth herein. All such embodiments are contemplated as within the scope of the present disclosure.

At block 310, condition data and/or event data may be received at a monitoring and configuration node. This data may be any type of data as described herein, or any other data that may be used to determine whether and how to configure a network. At block 320, the data received may be analyzed to determine whether network changes are to be made. Such analysis may include any analysis set forth herein or any other analysis that may be performed in network management. At block 330, a determination may be made as to whether any network reconfiguration should be performed in order to improve the performance of the network, or avoid future degradation of the network, in light of the data received at block 310 and the analysis performed at block 320. If no reconfiguration is needed, condition and/or event data may be further received at block 310. If reconfiguration is needed, at block 340 the appropriate reconfiguration commands may be determined, generated, and transmitted to the appropriate recipient devices.

The LTE integrated radio access network methods and systems described above assist in providing improved customer service by addressing network performance affecting uses quickly, automatically, and efficiently. By implementing the present disclosure, the user experience may be improved by correcting service problems quickly and avoiding other problems altogether. Set forth below are further exemplary systems, devices, and components in which aspects of the disclosed LTE integrated radio access network methods and systems may be implemented.

Figure 4:
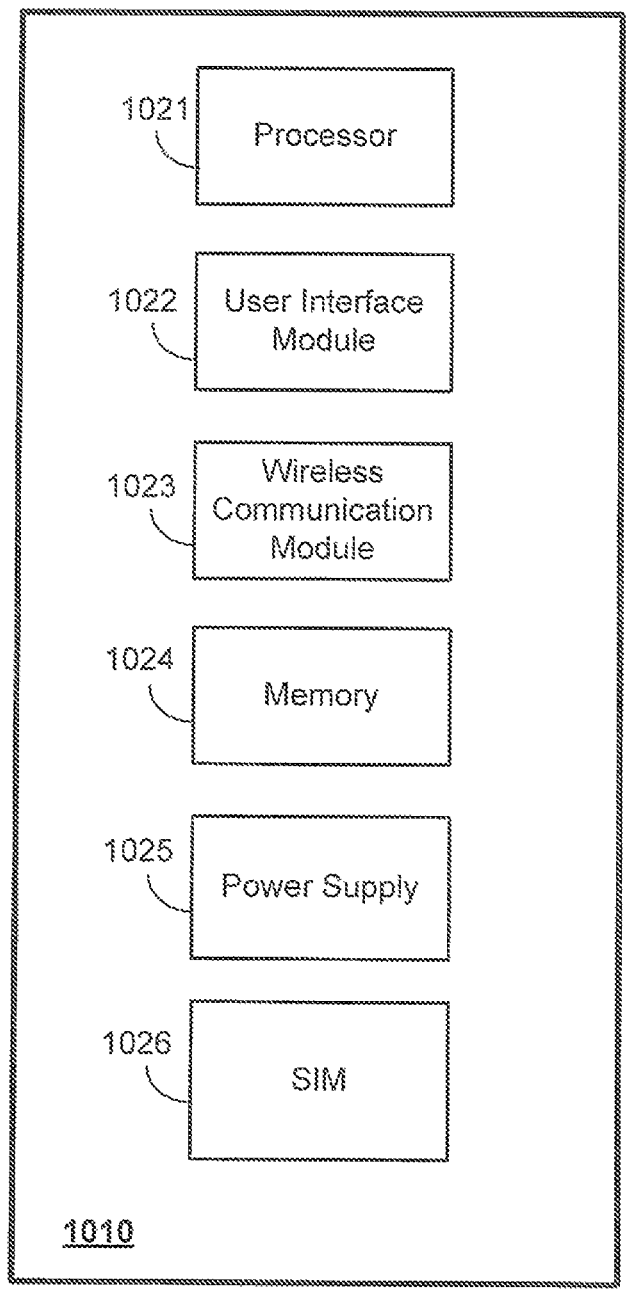
FIG. 4 is a block diagram of a non-limiting exemplary mobile device in which LTE integrated radio access network methods and systems may be implemented.

FIG. 4 illustrates an example wireless device 1010 that may be used in connection with an embodiment. References will also be made to other figures of the present disclosure as appropriate. For example, mobile devices 102 and 210 may be wireless devices of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 may execute software (i.e., computer-readable instructions stored on a tangible computer-readable medium) that may include functionality related to LTE integrated radio access network methods and systems, for example. In this embodiment, a tangible computer-readable storage medium comprising computer-executable instructions, which when executed by a processor, may cause the processor 1021 to perform operations comprising accessing a first radio access technology resource, and receiving information indicative of a condition of utilization of the first radio access technology resource. If the received information indicative of a condition of utilization indicates an adverse network condition, then the processor 1021 may instruct the wireless device 1010 to migrate to a second radio access technology resource.

The adverse network condition experienced by the first radio access resource may be one or more of an overload condition of utilization, an anticipated overload condition, a low signal strength condition, or an anticipated major event expected to cause both major outages and/or increased demands for service, such as a natural disaster, like a major hurricane. The receiving of information indicative of a condition of utilization of the first radio access technology resource may occur in real time. The operation of instructing the wireless device 1010 to migrate to a second radio access technology resource may comprise predicting, based on the information indicative of a condition of utilization, that an adverse network condition will occur.

User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, charging and/or billing data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like.

Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 5:
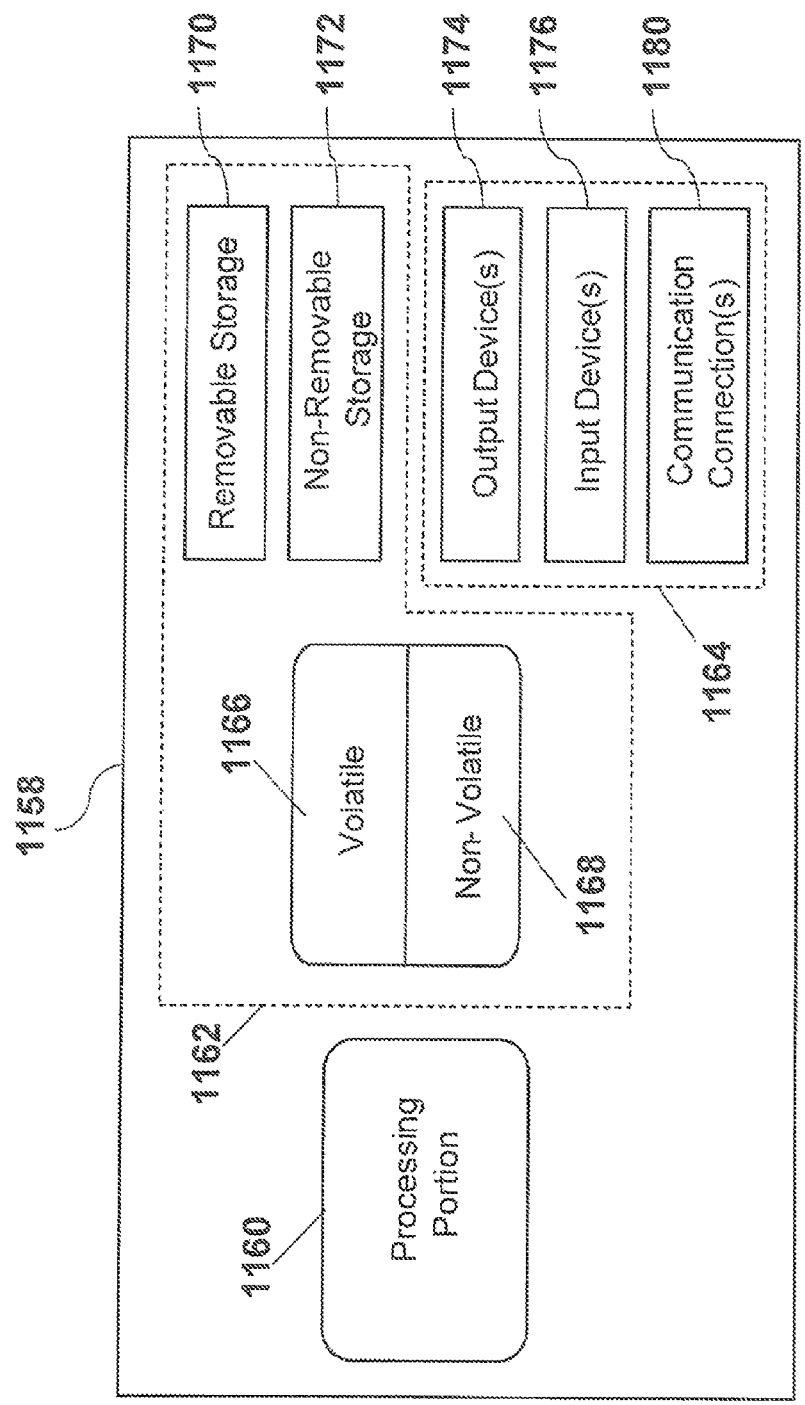
FIG. 5 is a block diagram of a non-limiting exemplary processor in which LTE integrated radio access network methods and systems may be implemented.

FIG. 5 is a block diagram of an example processor 1158 which may be employed in any of the embodiments described herein, including as one or more components of mobile devices 102 and 210, as one or more components of network equipment such as eNode-B 220, MME 230, PDN gateway 250, HLR/HSS 240, PCRF device 260, bandwidth manager 270, any other component of networks 106, 108, 110, 112, and 201, and/or any related equipment, and/or as one or more components of any third party system or subsystem that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 5, the processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, transmit and/or receive configuration data, transmit and receive device condition data, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing condition and event data, configuration commands, profiles, thresholds, APNs, MNCs, MCCs, service requests, radio resource requests, QoS and/or APN parameters, software for LTE integrated radio access network, device and link status, condition, and congestion data, text and data communications, calls, voicemail, multimedia content, visual voicemail applications, etc. Depending upon the exact configuration and type of processor, the memory portion 1162 can be volatile (such as RAM) 1166, non-volatile such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may be tangible storage media that may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein may include both storage media and communication media. The processor 1158 also may have input device(s) 1176 such as keyboard, keypad, mouse, pen, voice input device, touch input device, etc. Output device(s) 1174 such as a display, speakers, printer, etc. also may be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how LTE integrated radio access network methods and systems may be implemented with stationary and non-stationary network structures and architectures. It will be appreciated, however, that LTE integrated radio access network methods and systems as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE-Advanced. etc., as well as to other network services that become available in time. In this regard, LTE integrated radio access network methods and systems may be implemented independently of the method of data transport and does not depend on any particular network architecture or underlying protocols.

Figure 6:
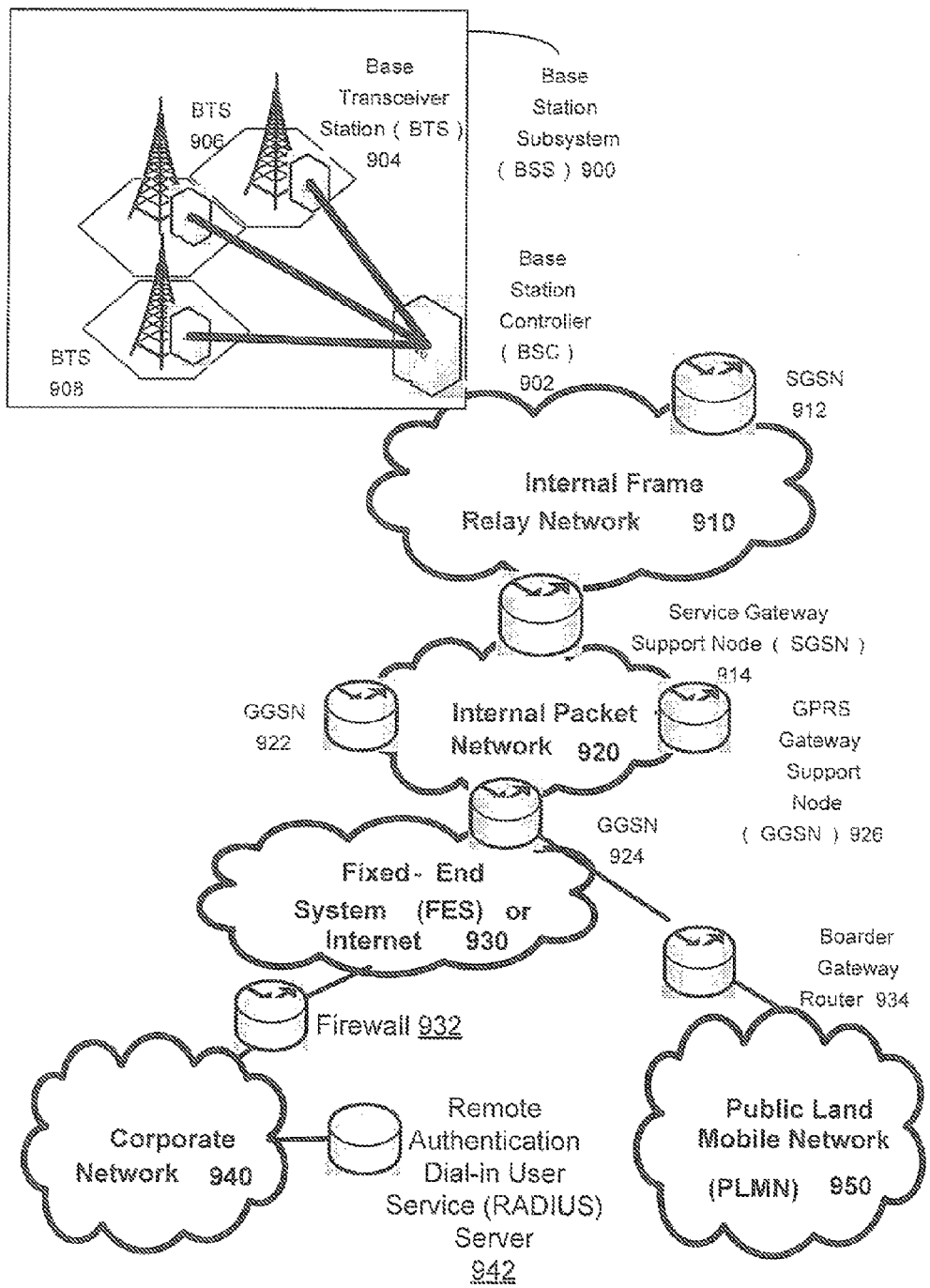
FIG. 6 is a block diagram of a non-limiting exemplary packet-based mobile cellular network environment, such as a GPRS network, in which LTE integrated radio access network methods and systems may be implemented.

FIG. 6 depicts an overall block diagram of an exemplary packet-based mobile cellular network environment, such as a GPRS network, in which LTE integrated radio access network systems and methods such as those described herein may be practiced. In an example configuration, any RAN as described herein may be encompassed by or interact with the network environment depicted in FIG. 6. Similarly, mobile devices 102 and 210 may communicate or interact with a network environment such as that depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 102 and 210) become connected to the wireless network. In exemplary fashion, the packet traffic originating from user devices (e.g., mobile devices 102 and 210) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc., may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
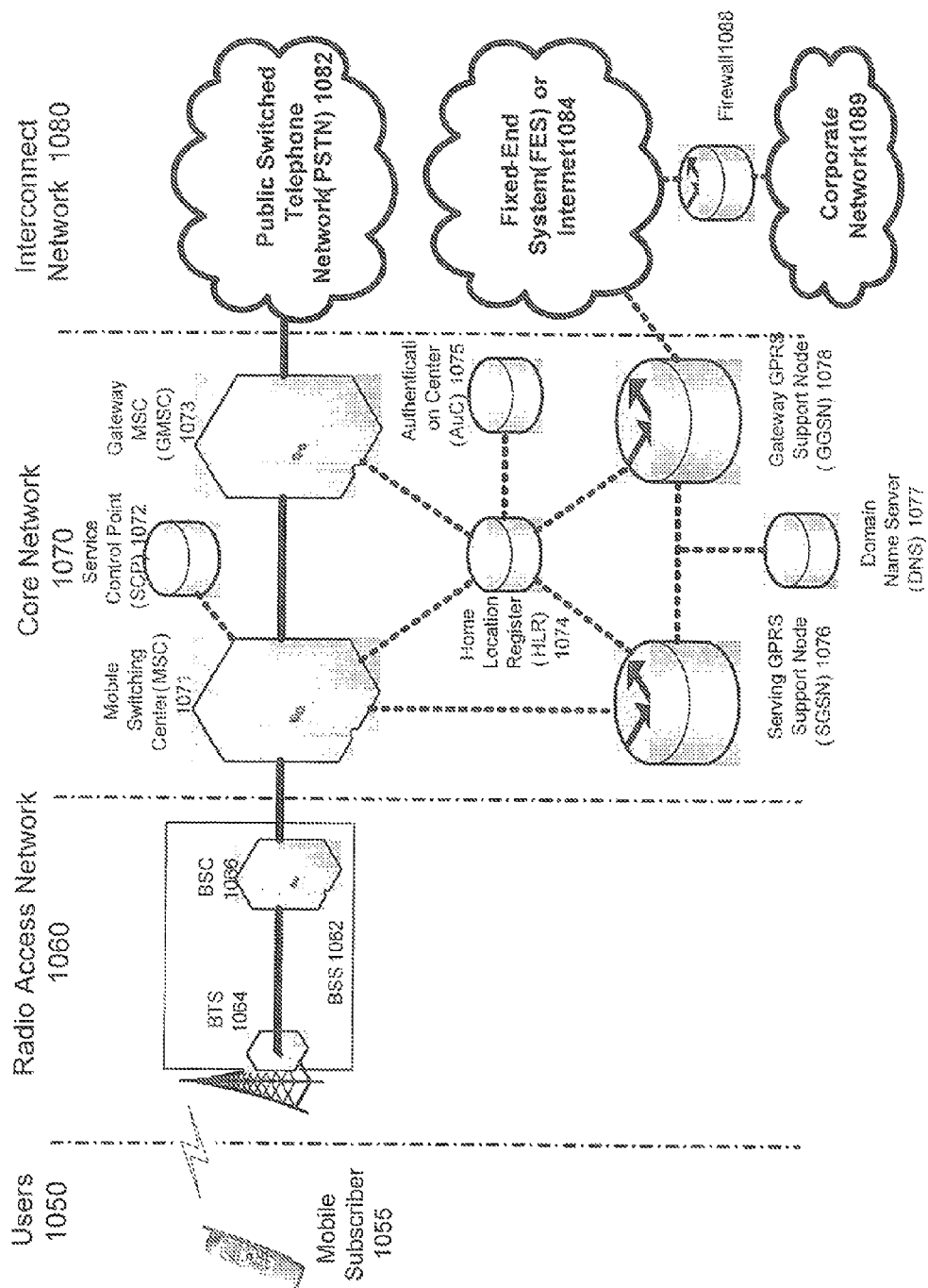
FIG. 7 illustrates a non-limiting exemplary architecture of a typical GPRS network, segmented into four groups, in which LTE integrated radio access network methods and systems may be implemented.

FIG. 7 illustrates an architecture of a typical GPRS network segmented into four groups: users 1050, radio access network 1060, core network 1070, and interconnect network 1080. Users 1050 may comprise a plurality of end users (although only mobile subscriber 1055 is shown in FIG. 7). In an example embodiment, the device depicted as mobile subscriber 1055 may comprise any of mobile devices 102 and 210. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR/HSS 240 may be a device such as HLR 1074. HLR 1074 may store static information about the subscribers such as the International Mobile Subscriber Identity (IMSI), APN profiles, profiles as disclosed herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 102 and 210, used by an end user of a mobile cellular service or a wireless provider. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of LTE integrated radio access network methods and systems such as those described herein may include, but are not limited to, Gateway GPRS Support Node tables, Fixed End System router tables, firewall systems, VPN tunnels, and any number of other network elements as required by the particular digital network.

Figure 8:
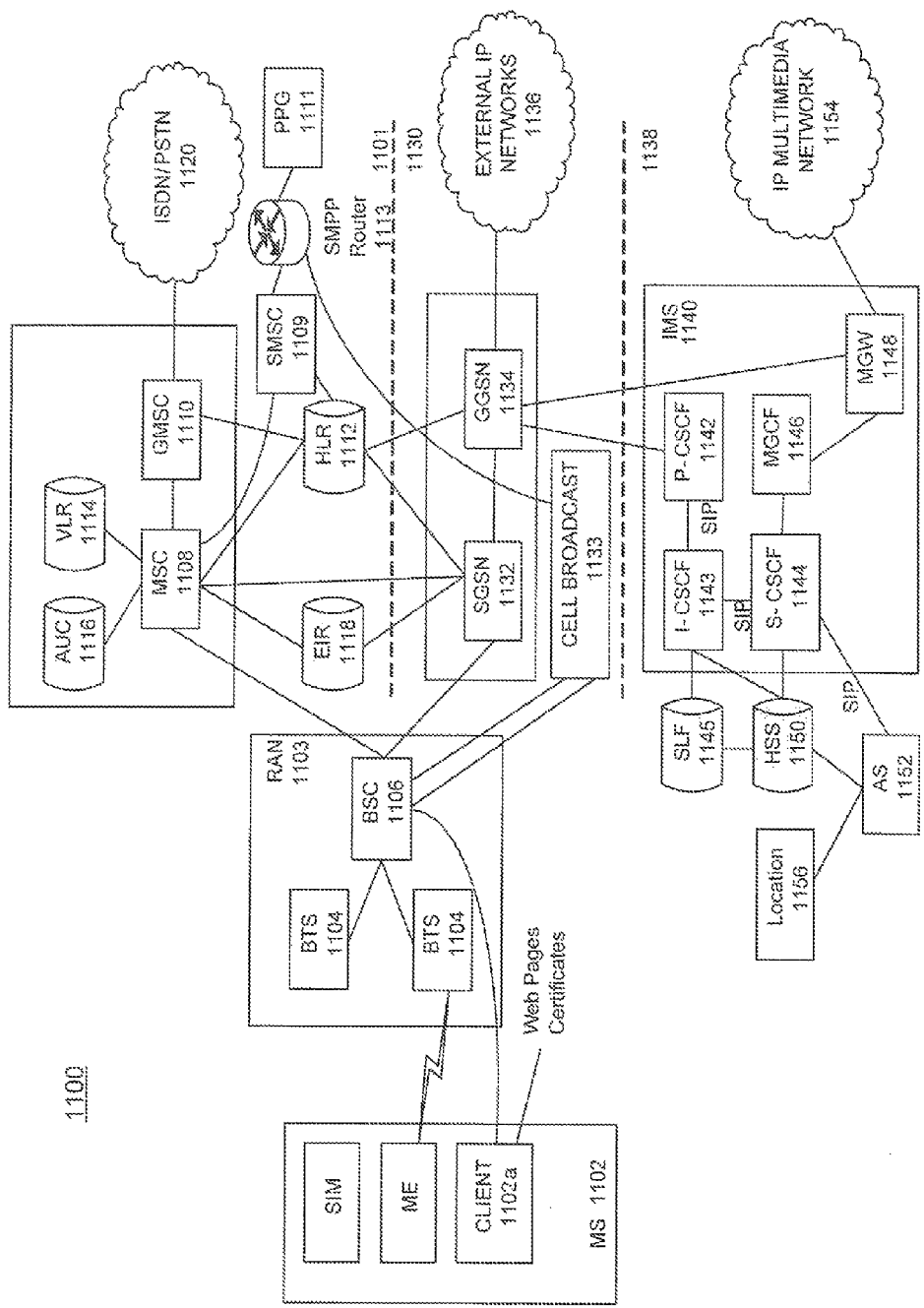
FIG. 8 illustrates a non-limiting alternate block diagram of an exemplary GSM/GPRS/IP multimedia network architecture in which LTE integrated radio access network methods and systems may be implemented.

FIG. 8 illustrates another exemplary block diagram view of a GSM/GPRS/IP multimedia network architecture 1100 in which the systems and methods for LTE integrated radio access network methods and systems such as those described herein may be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 102 and 210) that is used by mobile subscribers, in one embodiment with a Subscriber identity Module (SIM). The SIM may include an International Mobile Subscriber Identity (IMSI), which may be a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS may then activate a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of LTE integrated radio access network methods and systems have been described in connection with various communications devices and computing devices and processors, the underlying concepts can be applied to any communications or computing device, processor, or system capable of implementing the LTE integrated radio access network methods and systems described. The various techniques described herein may be implemented in connection with hardware or software or, where appropriate, with a combination of both. The methods and apparatuses for LTE integrated radio access network, or certain aspects or portions thereof, can take the form of program code (i.e., instructions) embodied in tangible and/or other media that is not a signal (i.e., not a transient signal per se) such as floppy diskettes, CD-ROMs, hard drives, or any other machine-readable storage medium, wherein, when the program code is loaded into and executed by a machine, such as a computer, the machine becomes an apparatus for the LTE integrated radio access network. In the case of program code execution on programmable computers, the computing device may include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for an LTE integrated radio access network may also be practiced via communications embodied in the form of program code that may be transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for an LTE integrated radio access network. When implemented on a general-purpose processor, the program code combines with the processor to provide a unique apparatus that operates to invoke the functionality of an LTE integrated radio access network as described herein. Additionally, any storage techniques used in connection with an LTE integrated radio access network system may be a combination of hardware and software.

Figure 9:
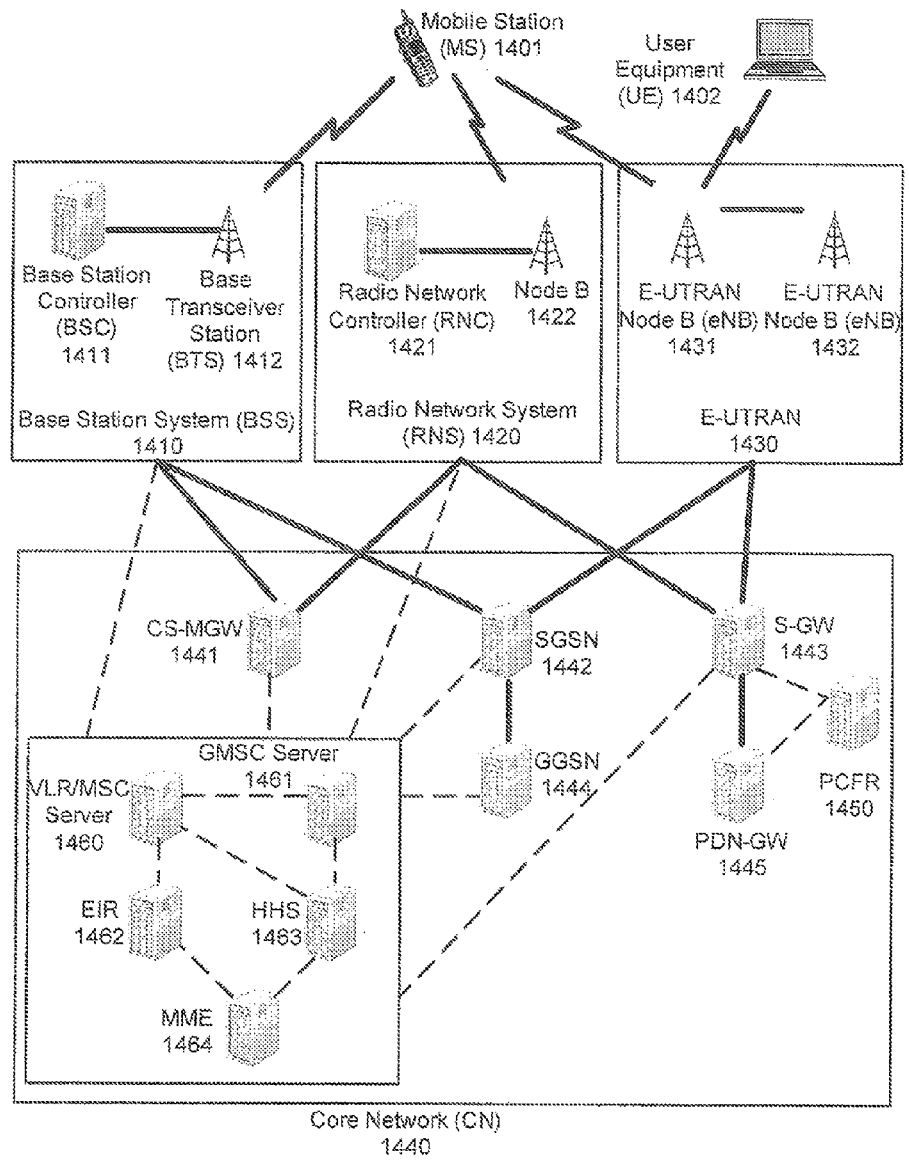
FIG. 9 illustrates a PLMN block diagram view of an example architecture in which LTE integrated radio access network methods and systems may be incorporated.

FIG. 9 illustrates a PLMN block diagram view of an example architecture in which text message generation for emergency services as a backup to voice communications may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network.

Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

In another embodiment of the disclosure, there may be provided a system for voice over LTE ("VoLTE"). VoLTE is a next generation LTE technology that may allow voice-over-IP (VoIP) to be transported using LTE. This, in turn, may permit VoIP to benefit from certain LTE advantages such as high bandwidth and low latency. VoLTE may also permit a wide range of VoIP related messaging and data services, such as for example, conducting a VoIP conversation and sharing vacation photos with friends, to be transported via LTE, thereby benefitting from the aforementioned LTE advantages.

Currently, and until the relevant network has 100% LTE coverage, VoLTE sessions are discontinued whenever LTE coverage becomes unavailable or insufficient. To solve for this, SRVCC, or Single Radio Voice Call Continuity, may permit VoLTE handover from an LTE network to a non-LTE network, such as 3G (CS or "Circuit Switch" voice or PS, for example). The success of such a handover, however, depends on the relevant 3G network being readily available at the time. If the 3G network is not available, or is too congested, the VoLTE session may be discontinued, resulting in a detrimental customer experience, such as dropped calls, and consequent loss of revenue to the service provider.

According to an embodiment of the disclosure, there may be provided a proactive network initiated SRVCC system and method, which may allow the network to proactively search for an alternative radio network resource, so that when a user device experiences a bad coverage area, the VoIP session may be successfully handed over to an alternative radio network resource. The system and method may include a priority management unit (PMU) that may allow the network to correspond the active VoIP session on each of the eNode B according to the relevant priority. Accordingly, when the LTE network resource is no longer available, the PMU may proactively determine that high priority VoIP sessions should continue to remain with the LTE bearer, and that low priority sessions should perform SRVCC functions to drop from the LTE bearer and hand over to an alternative bearer, such as 3G, WiFi, 2G, etc.

Figure 10:
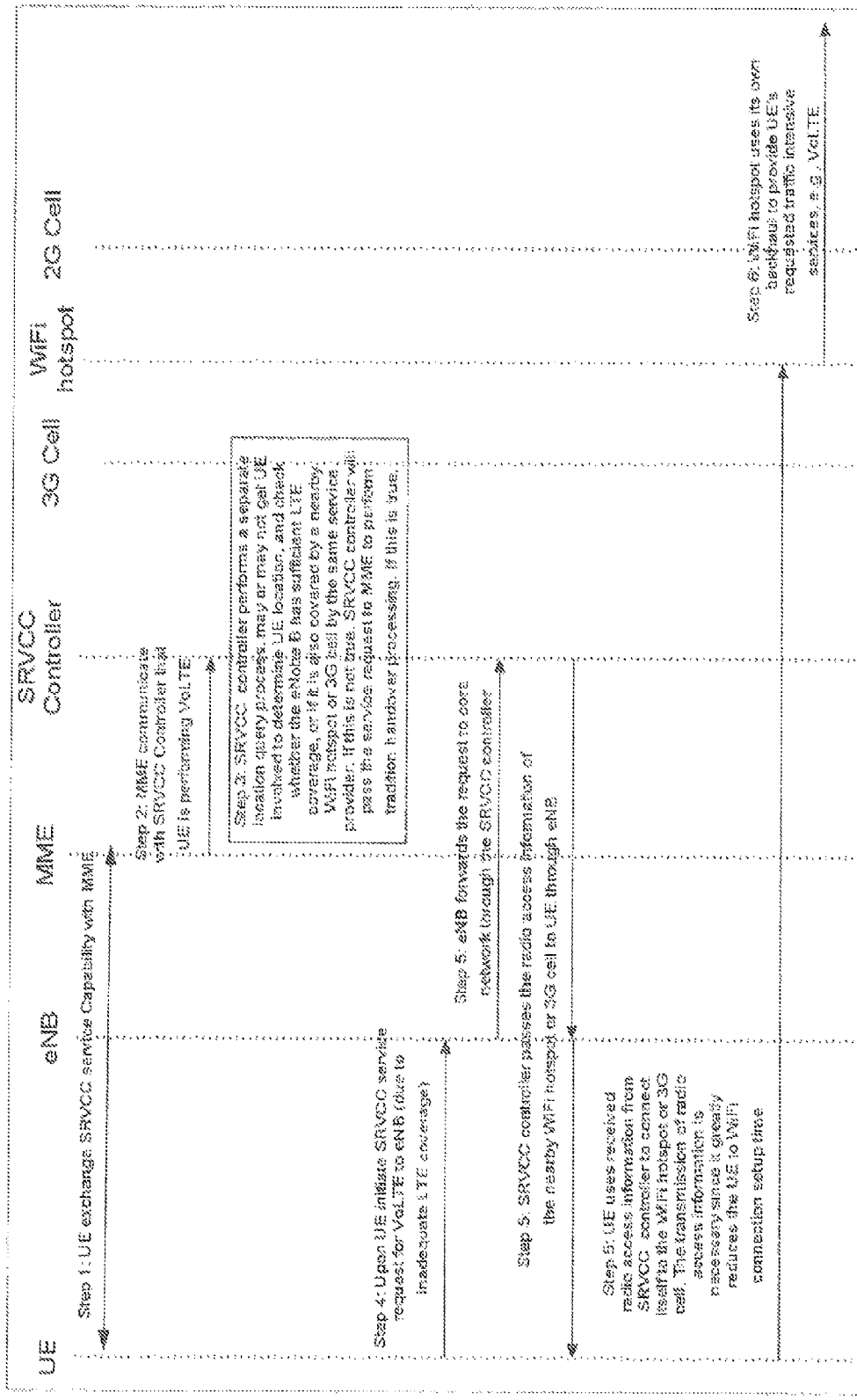
FIG. 10 illustrates another non-limiting exemplary network configuration in which LTE integrated radio access network methods and systems may be implemented.

Referring now to FIG. 10, there is illustrated a system and method of the disclosure. As illustrated, if a device ("UE") experiences an inadequate coverage situation during a VoIP session, that session may be handed over to an alternative radio network resource according to one or more of the following steps:

At step 1, the UE and network (i.e., MME) may exchange SRVCC capability during an initial context setup, during which the target cell may be forwarded an intra LTE handover request, the voice bearer may be identified, and the VoIP session may start.

At step 2, the network (i.e., MME) may inform the SRVCC controller that the UE is performing a VoLTE session.

At step 3, the SRVCC controller may perform an intelligent RAN discovery to identify an available alternative RAN resource, (3G, WiFi, 2G, etc.) in the surrounding coverage area. During this step 3, the SRVCC controller may perform a separate location query process, and may or may not involve the UE to determine the UE's location, and check whether the eNode B has sufficient LTE coverage, or if the eNode B ("eNB") is also covered by a nearby WiFi hotspot or 3G cell by the same service provider. If this check is not true, i.e., reveals insufficient LTE coverage, or that the eNB is not also covered by a nearby WiFi hotspot or 3G cell by the same service provider, then the SRVCC controller may pass the service request to the MME to perform traditional CS or PS handover processing. If, however, the check is true, then the SRVCC controller may select the most appropriate network domain to perform the SRVCC functions.

At step 4, the UE may initiate a SRVCC service request for VoLTE service, causing the network to receive an SRVCC trigger due to inadequate LTE coverage. The eNB may, in turn, forward this request at step 5 to the core network, i.e., MME, through the SRVCC controller. During this step, the SRVCC controller may pass the radio access information of the nearby WiFi hotspot or 3G cell to the UE through the eNB. The UE may, in turn, use the received radio access information from the SRVCC controller to connect itself to the WiFi hotspot or the 3G cell. The transmission of radio access information is highly preferred, and in some cases may be necessary, as it may greatly reduce the UE to WiFi connection setup time.

Figure 11:
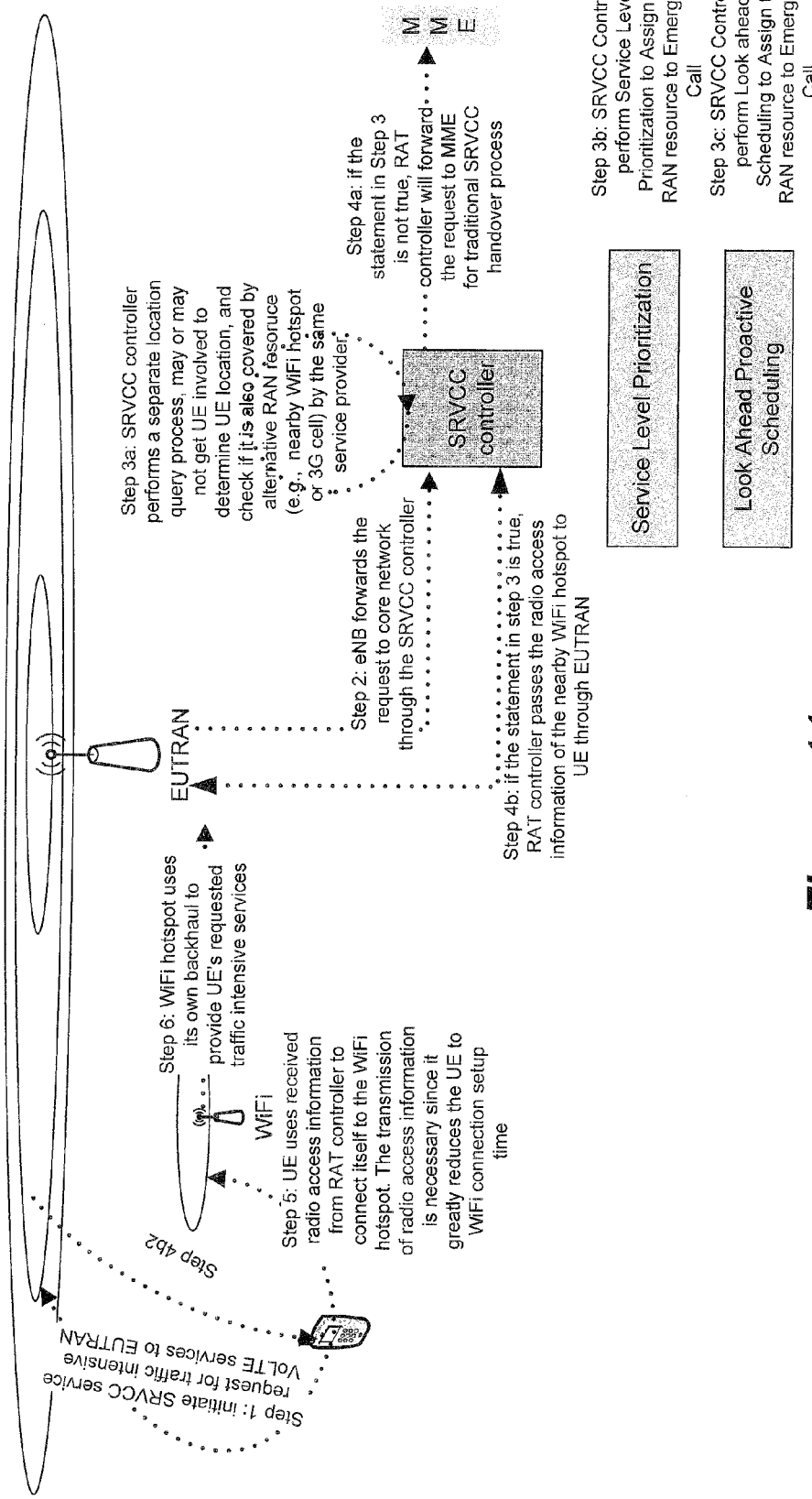
FIG. 11 illustrates another non-limiting exemplary network configuration in which LTE integrated radio access network methods and systems may be implemented.

Referring now to FIG. 11, there is illustrated a location service level priority system and method of the present disclosure, including a priority management unit (PMU) which may allow the network to correspond the active VoIP session on each eNode B according to the relevant priority. This system and method may include one or more of the following steps:

At step 1, the UE may initiate the SRVCC service request, for example, for traffic intensive VoLTE services to a network, i.e., a EUTRAN network. Location information and/or location based technology may reside on the UE or the network. The SRVCC controller may reside on the EUTRAN network.

At step 2, the eNB may forward the service request to the core network through the SRVCC controller. The SRVCC controller may thus receive the service request for delivering the SRVCC services.

At step 3a, the SRVCC controller may perform a separate location query process, and may or may not involve the UE to determine the UE's location; in either case, the SRVCC controller may seek, query, and obtain location information for the UE. Once the SRVCC controller obtains this location information, it may then check to determine if the UE is covered by an alternative RAN resource (e.g., a nearby WiFi hotspot or 3G cell) of the same service provider. Upon receiving notification that an alternative RAN resource is available, the SRVCC controller may allow the LTE network to efficiently switch back from the LTE network to the alternative RAN resource, for example a nearby WiFi hotspot, when that WiFi network becomes available.

At step 3b, the SRVCC controller may perform a service level prioritization step in order to determine the relative urgency of the service being requested. If, for example, the requested service is an emergency call, the SRVCC controller may set a high priority to the call and assign an alternative RAN resource to handle the call.

At step 3c, the SRVCC controller may perform look ahead proactive scheduling in order to assign an alternative RAN resource for the requested service. For example, the SRVCC controller may look ahead to determine upcoming traffic/load situations for the UE's LTE network, and may assign an alternative RAN resource to the UE, even in advance of the UE requesting service, or at the time of the requested service.

When the UE's LTE service is no longer available or insufficient, the PMU may thus proactively determine that a high priority VoIP session is in progress, in which case that session may stay with the LTE bearer, or that a low priority VoIP session is in progress, in which case the SRVCC controller may drop the UE from the LTE bearer and hand over the service to an alternative bearer, such as 3G, WiFi, 2G, etc.

At step 4a, if the SRVCC controller determines during step 3a that the UE is not covered by an alternative RAN resource by the same service provider, then it may forward the UE's service request to the MME for a traditional SRVCC (CS or PS) handover processing.

If however, the SRVCC controller determines during step 3a that the UE is covered by an alternative RAN resource by the same service provider, then the RAT (SRVCC) controller may, at step 4b, pass the alternative RAN resource information, e.g., for a nearby WiFi hotspot, to the UE through the EUTRAN.

At step 5, the UE may then use the received radio access information from the RAT controller to connect itself to the alternative RAN resource, e.g., nearby WiFi hotspot. The transmission of radio access information may be necessary since it greatly reduces the UE to WiFi connection setup time.

At step 6, the alternative RAN resource, e.g., nearby WiFi hotspot, may use its own backhaul to provide the UE's requested traffic intensive services, e.g., through the EUTRAN.

While LTE integrated radio access network methods and systems have been described in connection with the various embodiments of the various figures, it is to be understood that other similar embodiments may be used or modifications and additions may be made to the described embodiments for performing the same function of an LTE integrated radio access network without deviating therefrom. For example, one skilled in the art will recognize that an LTE integrated radio access network as described in the present application may apply to any environment, whether wired or wireless, and may be applied to any number of such devices connected via a communications network and interacting across the network. Therefore, LTE integrated radio access network methods and systems should not be limited to any single embodiment, but rather should be construed in breadth and scope in accordance with the appended claims.

We claim:

1. A method comprising:
   receiving, at a server configured in a long term evolution network, first information indicative of a first condition of utilization of a first radio access technology resource accessible by a user device;
   receiving, at the server, second information indicative of a second condition of utilization of a second radio access technology resource accessible by the user device;
   determining if at least one of the first condition of utilization or the second condition of utilization indicates an adverse network condition;
   based on a determination that at least one of the first condition of utilization or the second condition of utilization indicates an adverse network condition, comparing the first information and the second information;
   based on a result of the comparing, selecting an action from a plurality of actions comprising:
      transmitting, by the server, a change command instructing the user device to migrate to a second radio access technology resource; and
      transmitting, by the server, a change command to at least one network device to mitigate the adverse network condition.

2. The method of claim 1, wherein the server transmits the change command instructing the user device to migrate to the second radio access technology resource if the condition of utilization received by the server indicates an overload condition of the first radio access resource.

3. The method of claim 1, wherein the server transmits the change command instructing the user device to migrate to the second radio access technology resource if the condition of utilization received by the server indicates an anticipated overload condition of the first radio access resource.

4. The method of claim 1, wherein the server receives the first information and the second information in real time.

5. The method of claim 1, wherein the server determines that the second radio access technology resource has a current utilization condition that is less adverse than the condition of utilization of the first radio access technology resource.

6. The method of claim 1, further comprising:
   predicting, by the server, based on the first information and the second information, that an adverse network condition will occur.

7. The method of claim 1, wherein the server triggers an update of the user device's radio access technology resource by:
   instructing a target cell tower that the user device is migrating toward the target cell tower;
   proactively allocating radio resources to the target cell tower; and
   transferring updated radio access information to the user device.

8. An apparatus comprising:
   a processor; and
   memory comprising executable instructions that when executed by the processor, cause the processor to effectuate operations comprising:
      receiving first information indicative of a first condition of utilization of a first radio access technology resource accessible by a user device;
      receiving second information indicative of a second condition of utilization of a second radio access technology resource accessible by the user device;
      determining if at least one of the first condition of utilization or the second condition of utilization indicates an adverse network condition;
      based on a determination that at least one of the first condition of utilization or the second condition of utilization indicates an adverse network condition, comparing the first information and the second information;
      based on a result of the comparing, selecting an action from a plurality of actions comprising:
         instructing the user device to migrate to a second radio access technology resource; and
         providing a change command to at least one network device to mitigate the adverse network condition.

9. The apparatus of claim 8 wherein the adverse network condition comprises at least one of an overload condition of utilization, an anticipated overload condition, or a low signal strength condition of the first radio access resource, or an anticipated major event expected to cause both major outages and increased demands for service from the first radio access resource, such as a natural disaster.

10. The apparatus of claim 8, wherein the first information and the second information is received in real time.

11. The apparatus of claim 8, the operations further comprising:
   predicting, based on the first information and the second information, that an adverse network condition will occur.

12. The apparatus of claim 8, the operations further comprising,
   receiving information indicating that the user device is performing a voice over long term evolution session; and identifying available alternative radio access technology resources in a surrounding coverage area associated with the user device, and wherein:

the information indicative of a condition of utilization of the first radio technology resource, comprises a notification that the user device is experiencing inadequate long term evolution coverage, and the change command comprises alternative radio access technology information indicative of enabling the user device to connect to an alternative radio access technology resource identified by the server.

13. The apparatus of claim 8, the operations further comprising:

upon receiving the information indicative of a condition of utilization, determining whether the user device is receiving adequate long term evolution coverage in the surrounding coverage area, and upon a determination that the user devise is not receiving adequate long term evolution coverage in the surrounding coverage area, the change command comprises a request to perform handover processing, and upon a determination that the user device is receiving adequate long term evolution coverage in the surrounding coverage area, selecting a most appropriate network domain to perform single radio voice call continuity services in the surrounding coverage area on behalf of the user device.

14. The apparatus of claim 8, the operations further comprising:

receiving a service request to deliver single radio voice call continuity services to the user device, wherein the receiving of information indicative of a condition of utilization comprises performing a service level prioritization operation in order to determine a relative level of urgency of the service request, and upon a determination of a relatively high level of urgency of the service request, assigning an alternative radio access technology resource to handle the service request.

15. The apparatus of claim 8, the operations further comprising:

receiving a service request to deliver single radio voice call continuity services to the user device;

performing a look ahead proactive scheduling operation in order to determine anticipated traffic for the user device's long term evolution network; and if the look ahead proactive scheduling operation determines a relatively high level of anticipated traffic, then the change command comprises the server transmitting information indicative of assigning an alternative radio access technology resource to handle the service request.

16. The apparatus of claim 8, the operations further comprising:

receiving a service request to deliver single radio voice call continuity services to the user device determining if the user device is covered by an alternative radio access technology resource of a provider that is the same as a provider of services to the user device;

upon a determination that the user device is not covered by an alternative radio access technology resource of a provider that is the same as a provider of services to the user device, transmitting the service request to a mobility management gateway for handover processing; and upon a determination that the user device is covered by an alternative radio access technology resource of a provider that is the same as a provider of services to the user device, transmitting information indicative of the alternative radio access technology resource to the user device.

17. A tangible computer-readable storage medium that is not a propagating signal, the tangible computer-readable storage medium comprising computer-executable instructions, which when executed by a processor, cause the processor to effectuate operations comprising:

receiving first information indicative of a first condition of utilization of a first radio access technology resource accessible by a user device;

receiving second information indicative of a second condition of utilization of a second radio access technology resource accessible by the user device;

determining if at least one of the first condition of utilization or the second condition of utilization indicates an adverse network condition;

based on a determination that at least one of the first condition of utilization or the second condition of utilization indicates an adverse network condition, comparing the first information and the second information;

based on a result of the comparing, selecting an action from a plurality of actions comprising:

instructing the user device to migrate to a second radio access technology resource; and providing a change command to at least one network device to mitigate the adverse network condition.

18. The tangible computer-readable storage medium of claim 17, wherein the adverse network condition comprises at least one of an overload condition of utilization, an anticipated overload condition, or a low signal strength condition of the first radio access resource, or an anticipated major event expected to cause both major outages and increased demands for service from the first radio access resource, such as a natural disaster.

19. The tangible computer-readable storage medium of claim 17, wherein the first information and the second information is received in real time.

20. The tangible computer-readable storage medium of claim 17, the operations further comprising:

predicting, based on the first information and the second information, that an adverse network condition will occur.

* * * * *